United States Patent
Chari et al.

(10) Patent No.: US 10,628,600 B2
(45) Date of Patent: *Apr. 21, 2020

(54) AUTOMATIC AUDIT LOGGING OF EVENTS IN SOFTWARE APPLICATIONS PERFORMING REGULATORY WORKLOADS

(71) Applicant: International Business Machines Corporation, Armonk, NY (US)

(72) Inventors: Suresh N. Chari, Tarrytown, NY (US); Ted A. Habeck, Fishkill, NY (US); Ashish Kundu, Elmsford, NY (US); Ian M. Molloy, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 24 days.

This patent is subject to a terminal disclaimer.

(21) Appl. No.: 15/912,637

(22) Filed: Mar. 6, 2018

(65) Prior Publication Data
US 2018/0196958 A1 Jul. 12, 2018

Related U.S. Application Data

(63) Continuation of application No. 15/135,762, filed on Apr. 22, 2016, now Pat. No. 10,007,801.

(51) Int. Cl.
  *G06F 21/62* (2013.01)
  *G06F 8/41* (2018.01)
  *G06F 21/57* (2013.01)

(52) U.S. Cl.
  CPC .......... *G06F 21/6218* (2013.01); *G06F 8/427* (2013.01); *G06F 8/433* (2013.01); *G06F 21/577* (2013.01)

(58) Field of Classification Search
  CPC ....... G06F 21/6218; G06F 8/427; G06F 8/433
  See application file for complete search history.

(56) References Cited

U.S. PATENT DOCUMENTS 7,120,685 B2   10/2006   Ullmann et al.
8,769,701 B2   7/2014    Hinton et al.
(Continued)

OTHER PUBLICATIONS

Ganapathy et al., "Automatic Placement of Authorization Hooks in the Linux Security Modules Framework," Proceedings of the 12th ACM Conference on Computer and Communications Security, Nov. 2005, 10 pages.

(Continued)

*Primary Examiner* — Jeffrey C Pwu
*Assistant Examiner* — Thong P Truong
(74) *Attorney, Agent, or Firm* — Yee & Associates, P.C.

(57) ABSTRACT

Automatically generating audit logs is provided. Audit log statement insertion points are identified in software components of an application based on a static code analysis identifying start and end operations on sensitive data in the software components of the application. The application is instrumented with audit log statements at the audit log statement insertion points in the software components of the application. Audit logs of monitored sensitive data activity events in the application are generated using the audit log statements at the audit log statement insertion points in the software components of the application. A dynamic code analysis is performed on the application during execution of the application to prevent executing source code of the application from recording in the audit logs the sensitive data processed by the application.

24 Claims, 10 Drawing Sheets

(56) References Cited

U.S. PATENT DOCUMENTS

| | | |
|---|---|---|
| 8,847,966 B2 | 9/2014 | Williams |
| 2009/0248381 A1 | 10/2009 | Liu et al. |
| 2010/0058291 A1* | 3/2010 | Hahn .................. G06F 8/70 |
| | | 717/113 |
| 2017/0308712 A1 | 10/2017 | Chari et al. |

OTHER PUBLICATIONS

Mell et al., "The NIST Definition of Cloud Computing," National Institute of Standards and Technology Special Publication 800-145, Sep. 2011, 7 pages.

Office Action, dated Nov. 30, 2017, regarding U.S. Appl. No. 15/135,762, 16 pages.

Notice of Allowance, dated Feb. 28, 2018, regarding U.S. Appl. No. 15/135,762, 12 pages.

List of IBM Patents and Applications Treated as Related, dated Mar. 5, 2018, 2 pages.

\* cited by examiner

AUTOMATIC AUDIT LOGGING OF EVENTS IN SOFTWARE APPLICATIONS PERFORMING REGULATORY WORKLOADS

BACKGROUND

1. Field

The disclosure relates generally to automatically generating audit logs in software applications and more specifically to automatically generating audit logs of monitored sensitive data activity events in software applications that perform workloads corresponding to regulated services.

2. Description of the Related Art

An audit log is a record of monitored events in an information technology system. A monitored event is an identifiable occurrence that has significance for hardware and/or software components of the information technology system. An audit log may record what resources were accessed, destination and source addresses, and the like.

Federal Regulations, such as, for example, the Health Insurance Portability and Accountability Act (HIPAA) and the Gram-Leach-Bliley Act, include specific mandates regarding audit logs. For example, HIPAA provides data privacy and security provisions for safeguarding sensitive medical information of individuals. The Gram-Leach-Bliley Act controls the way financial institutions may use sensitive private information of individuals. As a result, information technology systems that process sensitive information related to individuals must generate audit logs showing compliance with the federal regulations.

However, current information technology systems that process these types of sensitive information, which may be regulated by federal, state, and/or local laws, do not automatically generate audit logs for each user access request to these types of sensitive information to determine exactly where sensitive information was accessed in a software application performing a workload corresponding to a regulated service, what sensitive information was accessed, who accessed the sensitive information, and when the sensitive information was accessed.

SUMMARY

According to one illustrative embodiment, a computer-implemented method for automatically generating audit logs is provided. A computer identifies audit log statement insertion points in software components of an application based on a static code analysis identifying start and end operations on sensitive data in the software components of the application. The computer instruments the application with audit log statements at the audit log statement insertion points in the software components of the application. The computer generates audit logs of monitored sensitive data activity events in the application using the audit log statements at the audit log statement insertion points in the software components of the application. The computer performs a dynamic code analysis on the application during execution of the application to prevent executing source code of the application from recording in the audit logs the sensitive data processed by the application. According to other illustrative embodiments, a computer system and computer program product for automatically generating audit logs are provided.

Current approaches to placing audit log statements in applications or programs require manual insertion by the software developers who often lack knowledge of auditing regulations or security best practices. Most software developers write audit log statements as a means for debugging an application, which do not provide the regulation required level of information for auditing purposes. By illustrative embodiments identifying locations in applications where sensitive data is processed, illustrative embodiments are able to automate the audit log statement placement process. As a result, software developers only need to complete the audit log statements for logging sensitive data activity by including domain-specific information. Inventors are not aware of any competing approaches, besides manual placement, for generating such audit logs.

In addition, the computer performs a dynamic code analysis on the application during execution of the application to prevent executing source code of the application from recording in the audit logs the sensitive data processed by the application. The computer analyzes the audit logs for compliance with audit requirements. Further, the computer performs an action step regarding non-compliance of the audit logs with the audit requirements.

The computer receives the application with labeled sensitive data and ingestion points within the application. The application performs a regulated service via a network. The computer identifies hardware components of a system hosting the regulated service and the software components of the application that are authorized to access the sensitive data located at the labeled sensitive data and ingestion points within the application. The computer performs a taint analysis on workflows tracking the sensitive data through the hardware components and the software components authorized to access the sensitive data. The computer determines input and output sensitive data flow points for the software components of the application based on the taint analysis on the workflows tracking the sensitive data. The computer generates a data flow graph and a control flow graph for the application based on the input and output sensitive data flow points for the software components of the application. The computer performs a static code analysis on the application to generate use-definition chains identifying start and end operations on the sensitive data in the software components of the application using the data flow graph and the control flow graph of the application.

DETAILED DESCRIPTION

Figure 1:
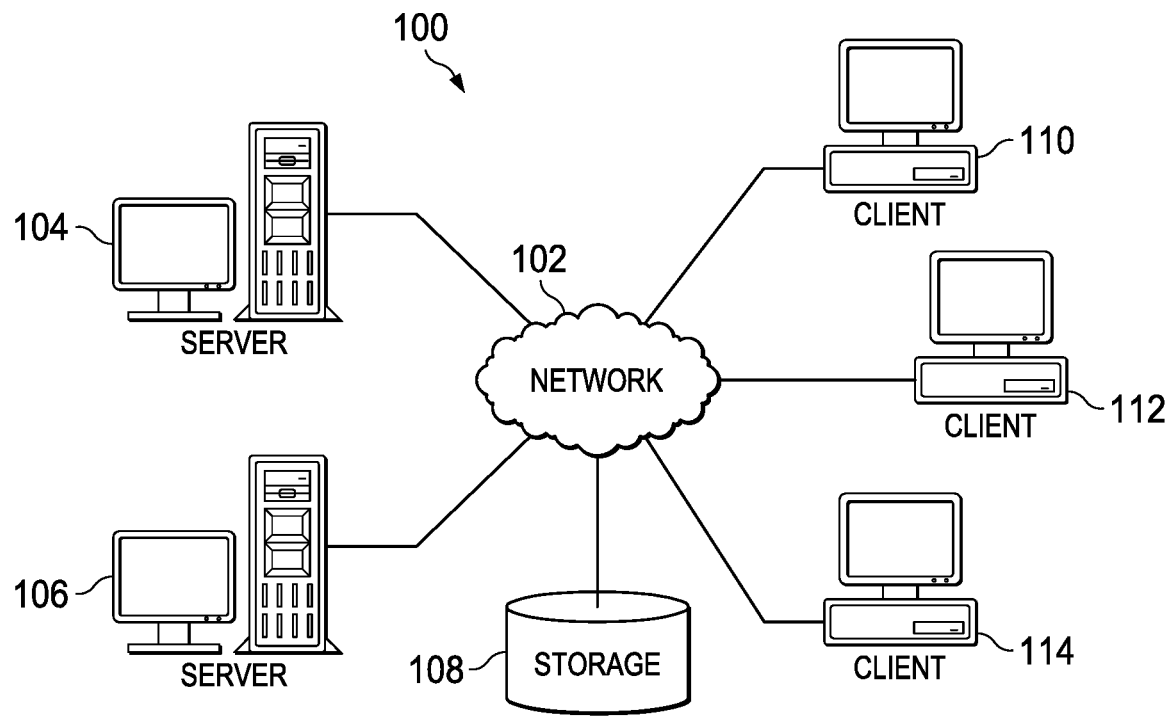
FIG. 1 is a pictorial representation of a network of data processing systems in which illustrative embodiments may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer readable program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular, with reference to FIGS. 1-5, diagrams of data processing environments are provided in which illustrative embodiments may be implemented. It should be appreciated that FIGS. 1-5 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102 and may each represent a set of one or more server computers. In addition, server 104 and server 106 may provide a set of one or more regulated services, such as, for example, a service that processes sensitive medical information or sensitive financial institution information corresponding to individuals. A regulated service is a service that is regulated by federal, state, or local regulations or laws. The federal, state, or local regulations may, for example, limit a type and amount of sensitive personal information that may be accessed, transmitted, or disclosed by the service, when this sensitive personal information may be accessed, and who may access this sensitive personal information. Further, in response to detecting sensitive data activity corresponding to the regulated service, server 104 and server 106 may automatically generate audit logs for the sensitive data activity events occurring in a set of one or more software applications that process the sensitive data corresponding to the regulated service. Furthermore, server 104 and server 106 may automatically analyze the audit logs for compliance with regulations and perform a set of one or more action steps to mitigate risk to the sensitive data in response to determining non-compliance with the regulations.

Client device 110, client device 112, and client device 114 also connect to network 102. Client devices 110, 112, and 114 are clients of server 104 and server 106. Server 104 and server 106 may provide information, such as boot files, operating system images, and software applications to client devices 110, 112, and 114.

Client devices 110, 112, and 114 may be, for example, computers, such as desktop computers or network computers with wire or wireless communication links to network 102. However, it should be noted that client devices 110, 112, and 114 are intended as examples only. In other words, client devices 110, 112, and 114 also may include other devices, such as, for example, laptop computers, handheld computers, smart phones, smart watches, personal digital assistants, or any combination thereof. Users of client devices 110, 112, and 114 may use client devices 110, 112, and 114 to access the set of regulated services provided by server 104 and server 106.

Storage 108 is a network storage device capable of storing any type of data in a structured format or an unstructured format. In addition, storage 108 may represent a set of one or more network storage devices. Storage 108 may store, for example, software applications that perform workloads corresponding to regulated services, audit logs corresponding to the software applications, and the like. Further, storage unit 108 may store other data, such as authentication or credential data that may include user names, passwords, and biometric data associated with system administrators, for example.

In addition, it should be noted that network data processing system 100 may include any number of additional server devices, client devices, and other devices not shown. Program code located in network data processing system 100 may be stored on a computer readable storage medium and downloaded to a computer or other data processing device for use. For example, program code may be stored on a computer readable storage medium on server 104 and downloaded to client device 110 over network 102 for use on client device 110.

In the depicted example, network data processing system 100 may be implemented as a number of different types of communication networks, such as, for example, an internet, an intranet, a local area network (LAN), and a wide area network (WAN). FIG. 1 is intended as an example, and not as an architectural limitation for the different illustrative embodiments.

Figure 2:
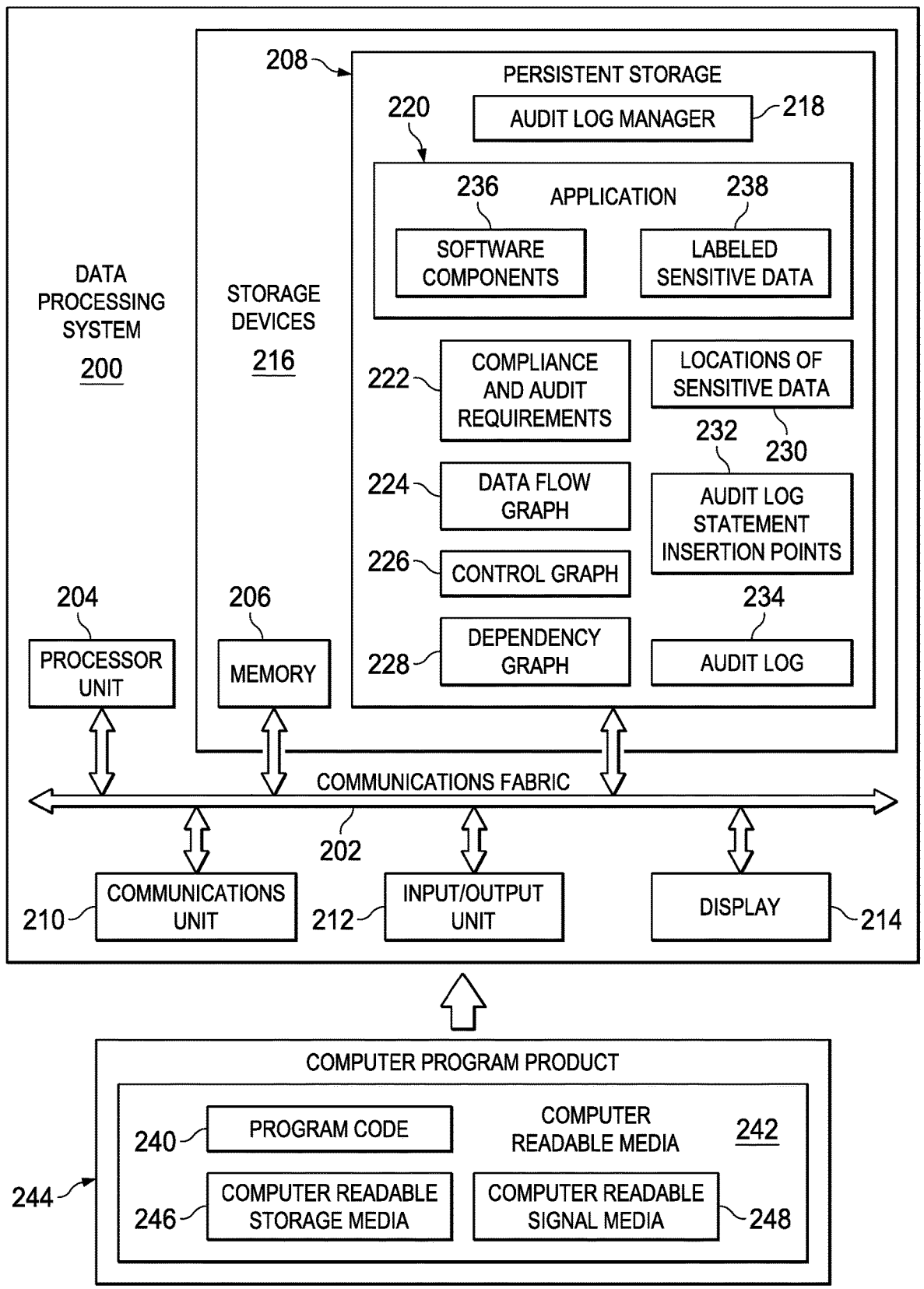
FIG. 2 is a diagram of a data processing system in which illustrative embodiments may be implemented.

With reference now to FIG. 2, a diagram of a data processing system is depicted in accordance with an illustrative embodiment. Data processing system 200 is an example of a computer, such as server 104 in FIG. 1, in which computer readable program code or program instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores audit log manager 218. Audit log manager 218 generates and monitors audit logs corresponding to sensitive data access activity in an application corresponding to a regulated service. It should be noted that even though audit log manager 218 is illustrated as residing in persistent storage 208, in an alternative illustrative embodiment audit log manager 218 may be a separate component of data processing system 200. For example, audit log manager 218 may be a hardware component coupled to communication fabric 202 or a combination of hardware and software components.

Also in this example, persistent storage 208 stores application 220, compliance and audit requirements 222, flow graph 224, control graph 226, dependency graph 228, locations of sensitive data 230, audit log statement insertion points 232, and audit log 234. However, it should be noted that alternative illustrative embodiments may include more or less data than illustrated.

Application 220 represents a software application that performs workloads corresponding to a regulated service. For example, application 220 may collect, process, and manage patient information, which is regulated by HIPAA, for an insurance company that processes medical claims. Audit log manager 218 may identify software components 236 and labeled sensitive data 238 in application 220. Software components 236 represent a plurality of different software components that comprise a software package corresponding to application 220. It should be noted that in an alternative embodiment, one or more components of software components 236 may be distributed remotely in one or more server computers connected to a network, such as network 102 in FIG. 1.

Audit log manager 218 also may identify which components in software components 236 process sensitive data corresponding to the regulated service. Labeled sensitive data 238 represent points or locations in application 220 where one or more of software components 236 process or utilize the sensitive data corresponding to the regulated service provided by application 220. It should be noted that labeled sensitive data 238 also may be data that is read into application 220 as input. Thus, illustrative embodiments may know all data input that is sensitive, and by analyzing the data and control flow, illustrative embodiments may determine when and where sensitive data is processed in application 220. A program developer of application 220 may, for example, previously label the sensitive data points or locations in application 220.

Audit log manager 218 may utilize compliance and audit requirements 222 to identify the requirements for generating audit logs corresponding to the regulated service provided by application 220. In addition, audit log manager 218 may utilize compliance and audit requirements 222 to determine whether monitored sensitive data activity events, which audit log manager 218 records within audit logs, performed by one or more components of application 220 are in compliance with a set of one or more federal, state, or local regulations. Further, audit log manager 218 may utilize compliance and audit requirements 222 to determine, for example, logging points within application 220, frequency of logging, and content of the audit logs.

Audit log manager 218 also may generate data flow graph 224 for application 220. Data flow graph 224 identifies the flow of sensitive data through application 220. Further, audit log manager 218 also may generate control graph 226 for application 220. Control graph 226 identifies the different paths that sensitive data may traverse through application 220 during execution of application 220. Furthermore, audit log manager 218 may generate dependency graph 228 for application 220. Dependency graph 228 identifies dependent sensitive data activity events among components within software components 236 of application 220.

Locations of sensitive data 230 represent where sensitive data is located within application 220. Audit log manager 218 may identify locations of sensitive data 230 by utilizing, for example, labeled sensitive data 238. Audit log manager 218 may utilize locations of sensitive data 230 to determine audit log statement insertion points 232. Audit log statement insertion points 232 represent locations within application 220 where audit log manager is to insert an audit log statement for generating an audit log entry for a monitored sensitive data activity event in a component of application 220. Audit log manager 218 may generate audit log 234 from audit log entries generated by audit log statements inserted within application 220 at audit log statement insertion points 232.

Communications unit 210, in this example, provides for communication with other computers, data processing systems, and devices via a network, such as network 102 in FIG. 1. Communications unit 210 may provide communications using both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), bluetooth technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer implemented program instructions, which may be located in a memory, such as memory 206. These program instructions are referred to as program code, computer usable program code, or computer readable program code that may be read and run by a processor in processor unit 204. The program code, in the different embodiments, may be embodied on different physical computer readable storage devices, such as memory 206 or persistent storage 208.

Program code 240 is located in a functional form on computer readable media 242 that is selectively removable and may be loaded onto or transferred to data processing system 200 for running by processor unit 204. Program code 240 and computer readable media 242 form computer program product 244. In one example, computer readable media 242 may be computer readable storage media 246 or computer readable signal media 248. Computer readable storage media 246 may include, for example, an optical or magnetic disc that is inserted or placed into a drive or other device that is part of persistent storage 208 for transfer onto a storage device, such as a hard drive, that is part of persistent storage 208. Computer readable storage media 246 also may take the form of a persistent storage, such as a hard drive, a thumb drive, or a flash memory that is connected to data processing system 200. In some instances, computer readable storage media 246 may not be removable from data processing system 200.

Alternatively, program code 240 may be transferred to data processing system 200 using computer readable signal media 248. Computer readable signal media 248 may be, for example, a propagated data signal containing program code 240. For example, computer readable signal media 248 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 240 may be downloaded over a network to persistent storage 208 from another device or data processing system through computer readable signal media 248 for use within data processing system 200. For instance, program code stored in a computer readable storage media in a data processing system may be downloaded over a network from the data processing system to data processing system 200. The data processing system providing program code 240 may be a server computer, a client computer, or some other device capable of storing and transmitting program code 240.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 246 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

It is understood that although this disclosure includes a detailed description on cloud computing, implementation of the teachings recited herein are not limited to a cloud computing environment. Rather, illustrative embodiments are capable of being implemented in conjunction with any other type of computing environment now known or later developed. Cloud computing is a model of service delivery for enabling convenient, on-demand network access to a shared pool of configurable computing resources, such as, for example, networks, network bandwidth, servers, processing, memory, storage, applications, virtual machines, and services, which can be rapidly provisioned and released with minimal management effort or interaction with a provider of the service. This cloud model may include at least five characteristics, at least three service models, and at least four deployment models.

The characteristics may include, for example, on-demand self-service, broad network access, resource pooling, rapid elasticity, and measured service. On-demand self-service allows a cloud consumer to unilaterally provision computing capabilities, such as server time and network storage, as needed automatically without requiring human interaction with the service's provider. Broad network access provides for capabilities that are available over a network and accessed through standard mechanisms that promote use by heterogeneous thin or thick client platforms, such as, for example, mobile phones, laptops, and personal digital assistants. Resource pooling allows the provider's computing resources to be pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction, such as, for example, country, state, or data center. Rapid elasticity provides for capabilities that can be rapidly and elastically provisioned, in some cases automatically, to quickly scale out and rapidly released to quickly scale in. To the consumer, the capabilities available for provisioning often appear to be unlimited and can be purchased in any quantity at any time. Measured service allows cloud systems to automatically control and optimize resource use by leveraging a metering capability at some level of abstraction appropriate to the type of service, such as, for example, storage, processing, bandwidth, and active user accounts. Resource usage can be monitored, controlled, and reported providing transparency for both the provider and consumer of the utilized service.

Service models may include, for example, Software as a Service (SaaS), Platform as a Service (PaaS), and Infrastructure as a Service (IaaS). Software as a Service is the capability provided to the consumer to use the provider's applications running on a cloud infrastructure. The applications are accessible from various client devices through a thin client interface, such as a web browser (e.g., web-based e-mail). The consumer does not manage or control the underlying cloud infrastructure including network, servers, operating systems, storage, or even individual application capabilities, with the possible exception of limited user-specific application configuration settings. Platform as a Service is the capability provided to the consumer to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service is the capability provided to the consumer to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of select networking components, such as, for example, host firewalls.

Deployment models may include, for example, a private cloud, community cloud, public cloud, and hybrid cloud. A private cloud is a cloud infrastructure operated solely for an organization. The private cloud may be managed by the organization or a third party and may exist on-premises or off-premises. A community cloud is a cloud infrastructure shared by several organizations and supports a specific community that has shared concerns, such as, for example, mission, security requirements, policy, and compliance considerations. The community cloud may be managed by the organizations or a third party and may exist on-premises or off-premises. A public cloud is a cloud infrastructure made available to the general public or a large industry group and is owned by an organization selling cloud services. A hybrid cloud is a cloud infrastructure composed of two or more clouds, such as, for example, private, community, and public clouds, which remain as unique entities, but are bound together by standardized or proprietary technology that enables data and application portability, such as, for example, cloud bursting for load-balancing between clouds.

A cloud computing environment is service oriented with a focus on statelessness, low coupling, modularity, and semantic interoperability. At the heart of cloud computing is an infrastructure comprising a network of interconnected nodes.

Figure 3:
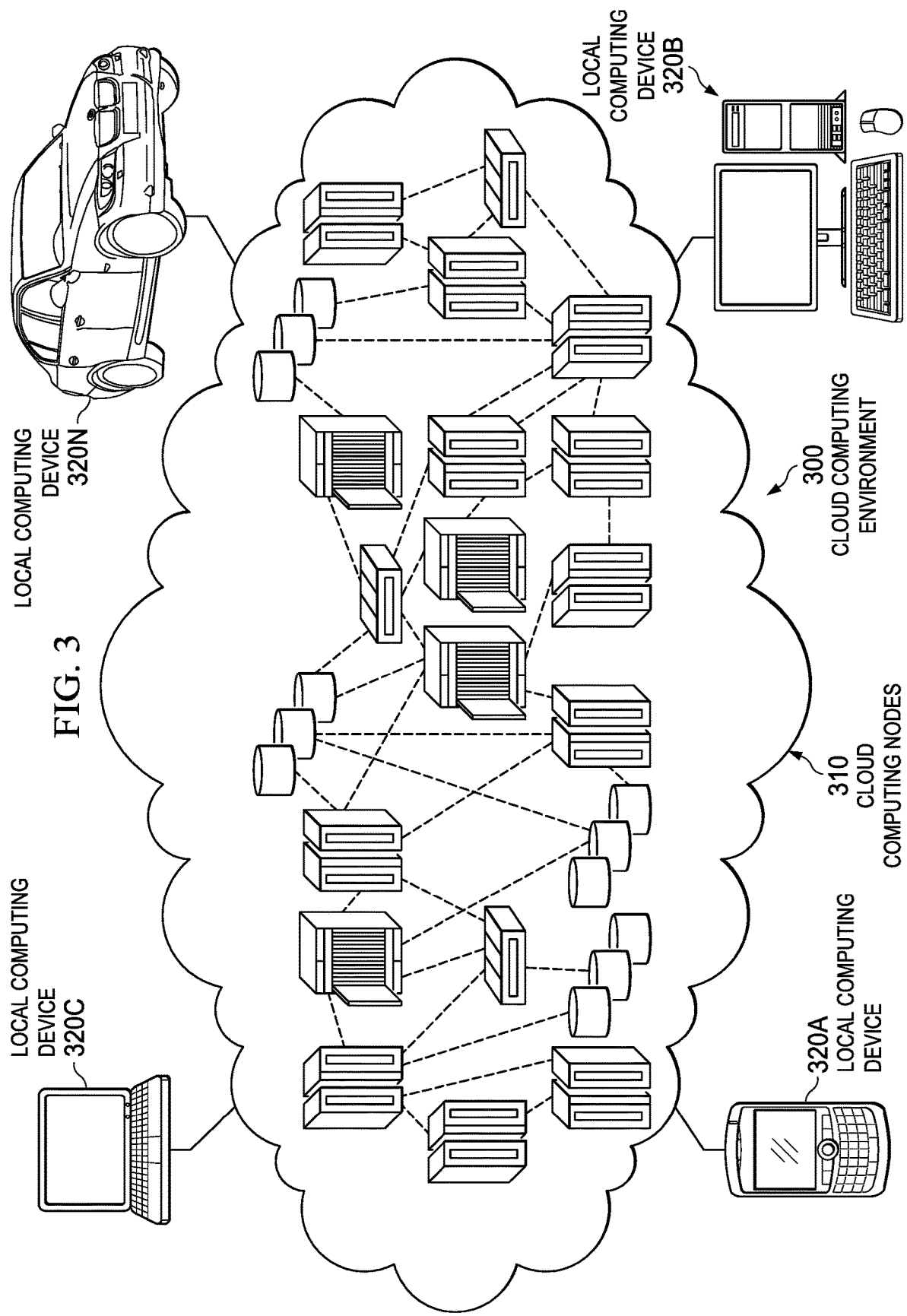
FIG. 3 is a diagram illustrating a cloud computing environment in which illustrative embodiments may be implemented.

With reference now to FIG. 3, a diagram illustrating a cloud computing environment is depicted in which illustrative embodiments may be implemented. In this illustrative example, cloud computing environment 300 includes a set of one or more cloud computing nodes 310 with which local computing devices used by cloud consumers, such as, for example, personal digital assistant or a smart phone 320A, desktop computer 320B, laptop computer 320C, and/or automobile computer system 320N, may communicate. Cloud computing nodes 310 may be, for example, server 104 and server 106 in FIG. 1. Local computing devices 320A-320N may be, for example, clients 110-114 in FIG. 1.

Cloud computing nodes 310 may communicate with one another and may be grouped physically or virtually into one or more networks, such as private, community, public, or hybrid clouds as described hereinabove, or a combination thereof. This allows cloud computing environment 300 to offer infrastructure, platforms, and/or software as services for which a cloud consumer does not need to maintain resources on a local computing device, such as local computing devices 320A-320N. It is understood that the types of computing devices 320A-320N are intended to be illustrative only and that cloud computing nodes 310 and cloud computing environment 300 can communicate with any type of computerized device over any type of network and/or network addressable connection using a web browser, for example.

Figure 4:
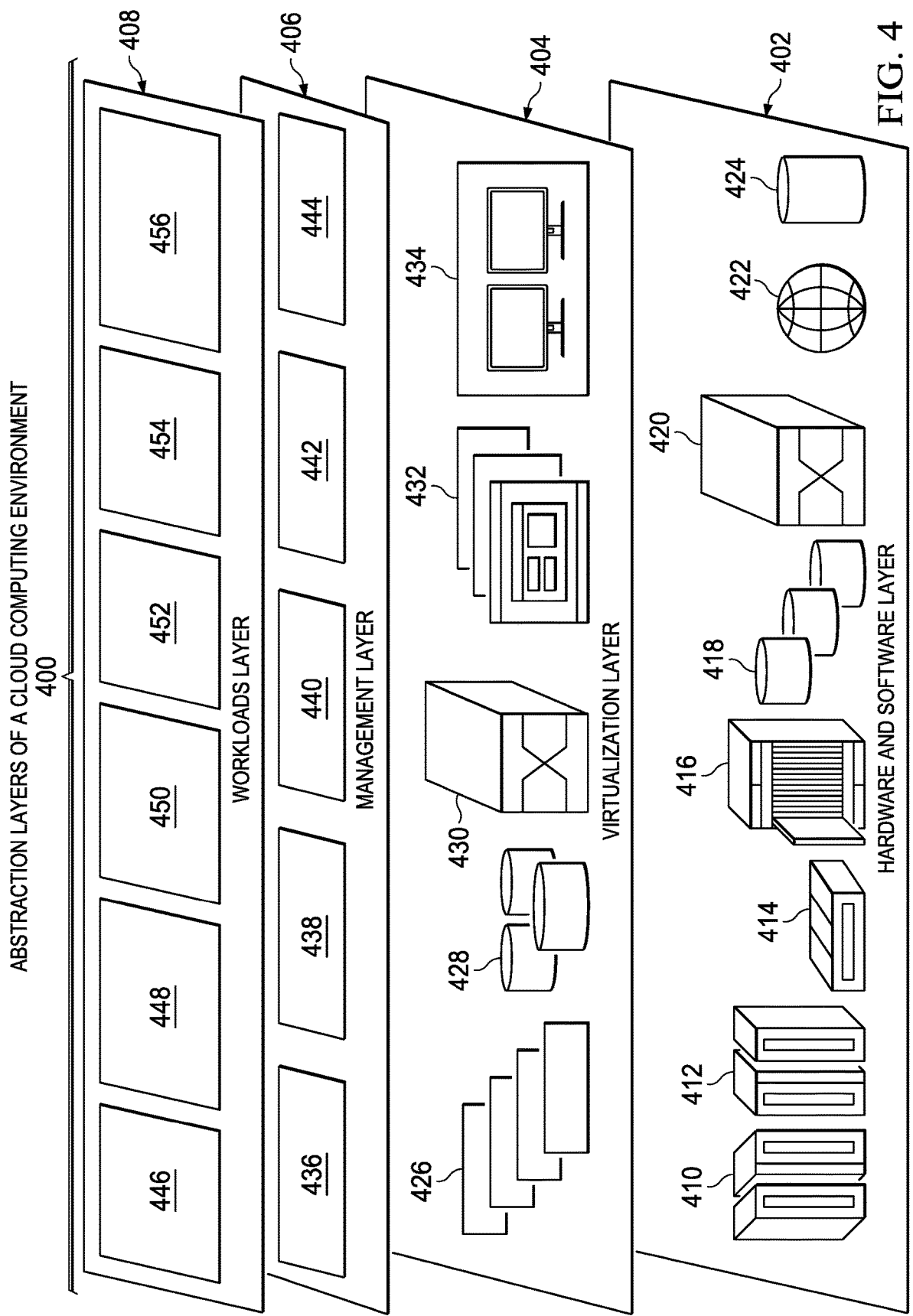
FIG. 4 is a diagram illustrating an example of abstraction layers of a cloud computing environment in accordance with an illustrative embodiment.

With reference now to FIG. 4, a diagram illustrating abstraction model layers is depicted in accordance with an illustrative embodiment. The set of functional abstraction layers shown in this illustrative example may be provided by a cloud computing environment, such as cloud computing environment 300 in FIG. 3. It should be understood in advance that the components, layers, and functions shown in FIG. 4 are intended to be illustrative only and embodiments of the invention are not limited thereto. As depicted, the following layers and corresponding functions are provided.

Abstraction layers of a cloud computing environment 400 includes hardware and software layer 402, virtualization layer 404, management layer 406, and workloads layer 408. Hardware and software layer 402 includes the hardware and software components of the cloud computing environment. The hardware components may include, for example, mainframes 410, RISC (Reduced Instruction Set Computer) architecture-based servers 412, servers 414, blade servers 416, storage devices 418, and networks and networking components 420. In some illustrative embodiments, software components may include, for example, network application server software 422 and database software 424.

Virtualization layer 404 provides an abstraction layer from which the following examples of virtual entities may be provided: virtual servers 426; virtual storage 428; virtual networks 430, including virtual private networks; virtual applications and operating systems 432; and virtual clients 434.

In one example, management layer 406 may provide the functions described below. Resource provisioning 436 provides dynamic procurement of computing resources and other resources, which are utilized to perform tasks within the cloud computing environment. Metering and pricing 438 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 440 provides access to the cloud computing environment for consumers and system administrators. Service level management 442 provides cloud computing resource allocation and management such that required service levels are met. Service level agreement (SLA) planning and fulfillment 444 provides pre-arrangement for, and procurement of, cloud computing resources for which a future requirement is anticipated in accordance with an SLA.

Workloads layer 408 provides examples of functionality for which the cloud computing environment may be utilized. Example workloads and functions, which may be provided by workload layer 408, may include mapping and navigation 446, software development and lifecycle management 448, virtual classroom education delivery 450, data analytics processing 452, transaction processing 454, and automatic generation of audit logs corresponding to monitored sensitive data activity events in software applications that perform regulated service workloads 456.

In the course of developing illustrative embodiments, it was discovered that current approaches to placing audit log statements in applications or programs require manual insertion by the software developers who often lack knowledge of auditing regulations or security best practices. Most software developers write audit log statements as a means for debugging an application, which do not provide the regulation required level of information for auditing purposes. By illustrative embodiments identifying locations in applications where sensitive data is processed, illustrative embodiments are able to automate the audit log statement placement process. As a result, software developers only need to complete the audit log statements for logging sensitive data activity by including domain-specific information. Further, by illustrative embodiments using dynamic analysis, illustrative embodiments are able to ensure that no sensitive data are leaked into generated audit logs.

Automatically generating audit logs for sensitive data activities or events, which are generated by a distributed application providing a regulated service via network, is a solution to a current problem. For example, companies utilize audit logs for monitoring security and compliance, as well as for forensic analysis. Illustrative embodiments automatically determine points or locations within an application where audit logs need to be generated to record sensitive data activity. Such points within an application may be, for example, locations where a set of one or more monitored sensitive data activities are performed by a data processing system in response to a user request, locations where a change in execution occur, locations where generation of cryptographic keys occur, locations where user authentication occur, locations where decryption of sensitive data occur, locations where encryption of sensitive data occur, locations where manipulation of sensitive data occur, locations where execution of privileged commands occur, and the like. A privileged command may, for example, provide a system administrator privileged access to an application to update the software. However, sensitive data processed by the application may be at risk during the privileged access to update the software.

Illustrative embodiments may automatically determine the "logging points" in a distributed application, which may be hosted on a cloud, using static analysis and dynamic analysis, for example. Static analysis examines source code of an application without executing the application to identify possible sensitive data vulnerabilities within the static (i.e., non-running) source code. Static analysis may include, for example, data flow analysis and taint analysis. Data flow analysis examines the flow of sensitive data through an application. Taint analysis attempts to identify sensitive data that may have been tainted and traces the tainted sensitive data to possible vulnerable components of the application. Static analysis aids illustrative embodiments in identifying security relevant portions of the application's source code. Dynamic analysis examines source code of the application during execution of the application to determine whether the running source code is leaking sensitive data into generated audit logs.

Illustrative embodiments identify common software components that are utilized for multiple sensitive data operations. For example, decryption, which is a common block of code, may be utilized in multiple sensitive data operations. Further, illustrative embodiments may generate dependency graphs of monitored sensitive data activity among the common software components. Furthermore, illustrative embodiments may apply compliance and audit requirements to determine the logging points, frequency of logging, and contents of generated audit logs. In addition, illustrative embodiments may make a determination as to which logging points may require synchronous logging and which logging points may require asynchronous logging (i.e., sensitive data activity logging that does not require time stamp information).

Illustrative embodiments identify a set of hardware and software components of a distributed service. The set of components may include, for example, network storage devices, data processing systems that host the service, software components of an application that performs the service, network communication devices, and other entities of the service that are authorized to access sensitive data associated with the service, such as medical information regarding an individual. The forms of sensitive data access may include, for example, remote storage of the sensitive data, transmission of the sensitive data via a network, processing of the sensitive data, or temporary local storage of the sensitive data, which is deleted after processing. In addition, illustrative embodiments identify the time and other meta-data associated with such authorized sensitive data accesses.

Illustrative embodiments may perform a taint analysis on the distributed service, which consists of the set of hardware and software components, to determine the flow of sensitive data, sensitive data operations in the service, and the data processing system or systems hosting the service. For each software component of the application that performs the service, illustrative embodiments determine the "points" or locations, which are part of the data flow and/or control flow with respect to the taint analysis, where sensitive data operations occur requiring logging. Illustrative embodiments may generate a flow graph and control flow graph in order to perform a static analysis, such as, for example, a use-definition analysis based on static single assignment, time slicing based on "taint points" as criteria for determining a start and an end of any operation that influences the sensitive data or operation as a whole. A use-definition analysis identifies a use of a variable and all definitions of that variable that can reach that use without any other intervening definitions. As a result, illustrative embodiments by utilizing use-definition analysis are able to identify and track logical representations of all of the variables through the source code of the application. Static single assignment requires that each variable is assigned exactly once and every variable is defined before it is used.

Illustrative embodiments output all identified audit log statement insertion points within the application where sensitive data operations occur requiring logging, the types of the audit log statement insertion points, and content of audit log entries that illustrative embodiments generate. Illustrative embodiments instrument the application with the audit log statements at the identified audit log statement insertion points within the application. Illustrative embodiments then generate audit log entries using the audit log statements within the application. Further, illustrative embodiments do not record any sensitive data (e.g., confidential or private information regarding an individual) within generated audit log entries. Thus, illustrative embodiments analyze source code of an application performing a regulated service in a distributed system in order to instrument the application to log sensitive data events that are specific to security and compliance requirements, such as, for example, HIPAA compliance.

Figure 5:
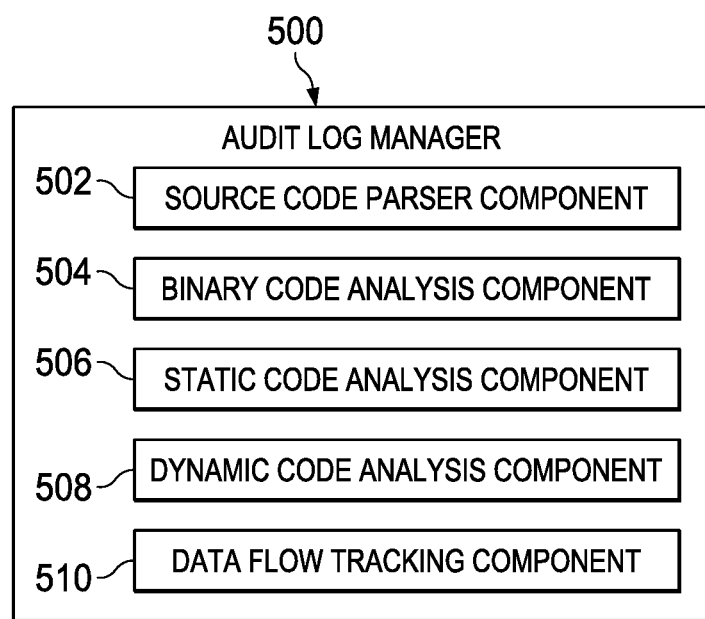
FIG. 5 is a diagram of an example audit log manager in accordance with an illustrative embodiment.

With reference now to FIG. 5, a diagram of an example audit log manager is depicted in accordance with an illustrative embodiment. Audit log manager 500 may be implemented in, for example, a network of distributed data processing systems, such as network data processing system 100 in FIG. 1, in a single data processing system, such as data processing system 200 in FIG. 2, or in a cloud computing environment, such as cloud computing environment 300 in FIG. 3. Also, audit log manager 500 may be, for example, audit log manager 218 in FIG. 2.

In this example, audit log manager 500 includes source code parser component 502, binary code analysis component 504, static code analysis component 506, dynamic code analysis component 508, and data flow tracking component 510. However, it should be noted that illustrative embodiments are not limited to such. In other words, audit log manager 500 may include more or fewer components than illustrated in alternative illustrative embodiments. For example, alternative illustrative embodiments may combine two or more components into a single component or divide a particular component into two or more components.

Audit log manager 500 utilizes source code parser component 502 to scan and analyze the source code of an application, such as application 220 in FIG. 2, which provides a regulated service. Audit log manager 500 utilizes binary code analysis component 504 to read and analyze code of third party software packages and libraries, which are only available in binary form. Audit log manager 500 utilizes static code analysis component 506 to perform a static analysis of non-executing source code of the application to determine sensitive data vulnerabilities in components of the application. Audit log manager 500 utilizes dynamic code analysis component 508 to perform a dynamic analysis of executing source code of the application to determine whether sensitive data is being recorded in generated audit log entries. Audit log manager 500 utilizes data flow tracking component 510 to perform a taint analysis on both static and dynamic instances of the application.

Figure 6A:
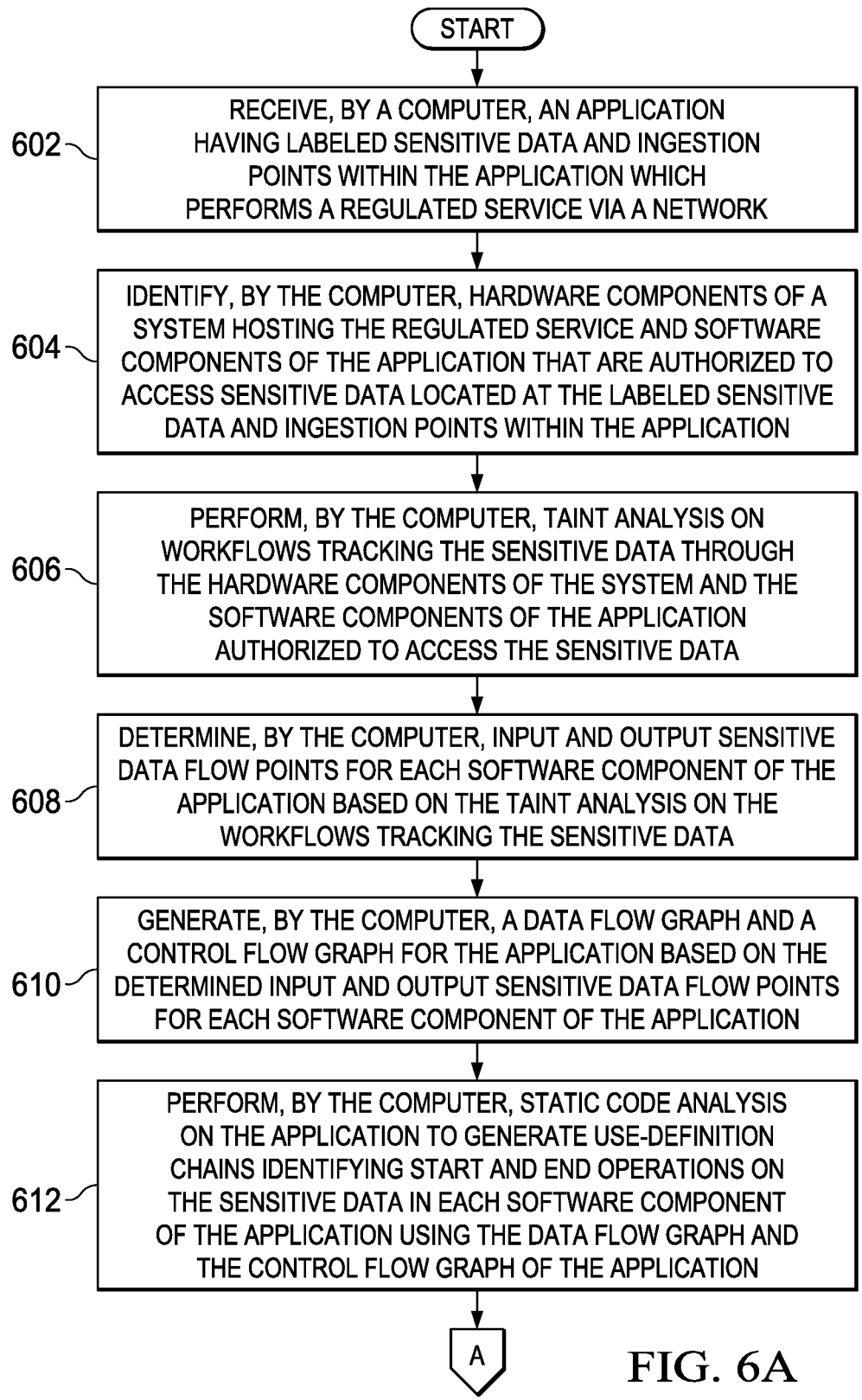
FIGS. 6A-6B are a flowchart illustrating a process for generating audit logs of monitored sensitive data activity events in accordance with an illustrative embodiment.
Figure 6B:
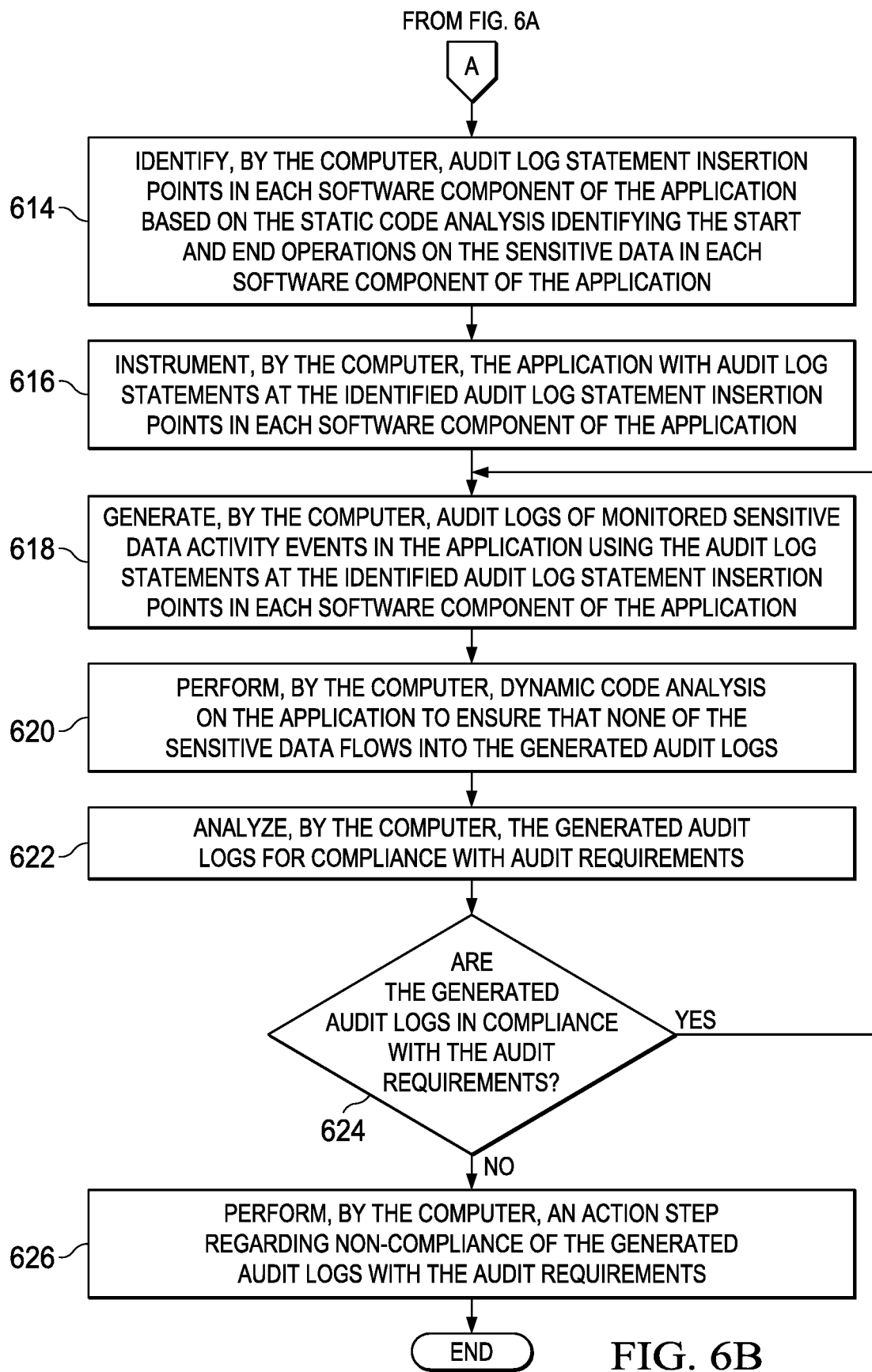

With reference now to FIGS. 6A-6B, a flowchart illustrating a process for generating audit logs of monitored sensitive data activity events is shown in accordance with an illustrative embodiment. The process shown in FIGS. 6A-6B may be implemented in a computer, such as, for example, server 104 FIG. 1 and data processing system 200 in FIG. 2.

The process begins when the computer receives an application having labeled sensitive data and ingestion points within the application which performs a regulated service via a network (step 602). The application may be, for example, application 220 in FIG. 2. In addition, the computer identifies hardware components of a system hosting the regulated service and software components of the application that are authorized to access sensitive data located at the labeled sensitive data and ingestion points within the application (step 604).

Further, the computer performs a taint analysis on workflows tracking the sensitive data through the hardware components of the system and the software components of the application authorized to access the sensitive data (step 606). Furthermore, the computer determines input and output sensitive data flow points for each software component of the application based on the taint analysis on the workflows tracking the sensitive data (step 608). Moreover, the computer generates a data flow graph and a control flow graph for the application based on the determined input and output sensitive data flow points for each software component of the application (step 610).

Afterward, the computer performs a static code analysis on the application to generate use-definition chains identifying start and end operations on the sensitive data in each software component of the application using the data flow graph and the control flow graph of the application (step 612). Subsequently, the computer identifies audit log statement insertion points in each software component of the application based on the static code analysis identifying the start and end operations on the sensitive data in each software component of the application (step 614). Then, the computer instruments the application with audit log statements at the identified audit log statement insertion points in each software component of the application (step 616).

The computer generates audit logs of monitored sensitive data activity events in the application using the audit log statements at the identified audit log statement insertion points in each software component of the application (step 618). It should be noted that the computer may generate an audit log for each instance when, for example, sensitive data is read from a file, a socket, or a data storage middleware; written to a file, a socket, or a data storage middleware; or passed to a function in a library. The computer also performs a dynamic code analysis on the application to ensure that none of the sensitive data flows into the generated audit logs (step 620).

In addition, the computer analyzes the generated audit logs for compliance with audit requirements (step 622). Afterward, the computer makes a determination as to whether the generated audit logs are in compliance with the audit requirements (step 624). If the computer determines that the generated audit logs are in compliance with the audit requirements, yes output of step 624, then the process returns to step 618 where the computer continues to generate audit logs. If the computer determines that the generated audit logs are not in compliance with the audit requirements, no output of step 624, then the computer performs an action step regarding non-compliance of the generated audit logs with the audit requirements (step 626). One possible action step may be for the computer to notify a system administrator of the non-compliance for possible correction and mitigation of risk to the sensitive data. Another possible action step may be for the computer to stop access to the sensitive data until correction by the system administrator can be accomplished. Thereafter, the process terminates.

Figure 7:
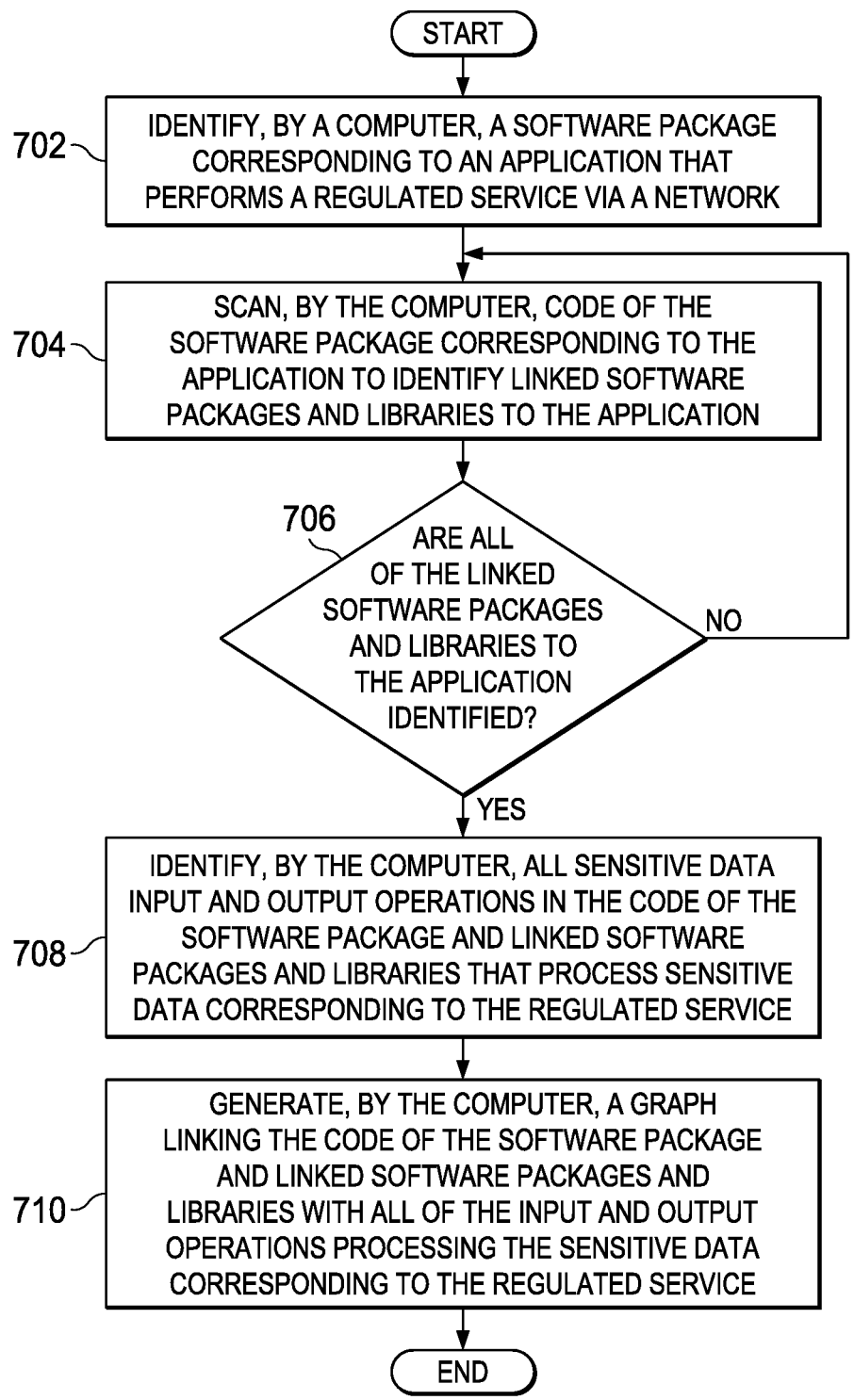
FIG. 7 is a flowchart illustrating a process for identifying sensitive data input and output operations in an application performing a regulated service in accordance with an alternative illustrative embodiment.

With reference now to FIG. 7, a flowchart illustrating a process for identifying sensitive data input and output operations in an application performing a regulated service is shown in accordance with an alternative illustrative embodiment. The process shown in FIG. 7 may be implemented in a computer, such as, for example, server 104 FIG. 1 and data processing system 200 in FIG. 2.

The process begins when the computer identifies a software package corresponding to an application that performs a regulated service via a network (step 702). The application and software package may be, for example, application 220 and software components 236 in FIG. 2. In addition, the computer scans code of the software package corresponding to the application to identify linked software packages and libraries to the application (step 704). The computer may user a parser, such as, for example, source code parser component 502 in FIG. 5, to scan the code of the software package corresponding to the application.

Afterward, the computer makes a determination as to whether all of the linked software packages and libraries to the application are identified (step 706). If the computer determines that all of the linked software packages and libraries to the application have not been identified, no output of step 706, then the process returns to step 704 where the computer continues to scan the code of the software package corresponding to the application. If the computer determines that all of the linked software packages and libraries to the application have been identified, yes output of step 706, then the computer identifies all sensitive data input and output operations in the code of the software package and linked software packages and libraries that process sensitive data corresponding to the regulated service (step 708). Subsequently, the computer generates a graph linking the code of the software package and linked software packages and libraries with all of the input and output operations processing the sensitive data corresponding to the regulated service (step 710). Thereafter, the process terminates.

Figure 8A:
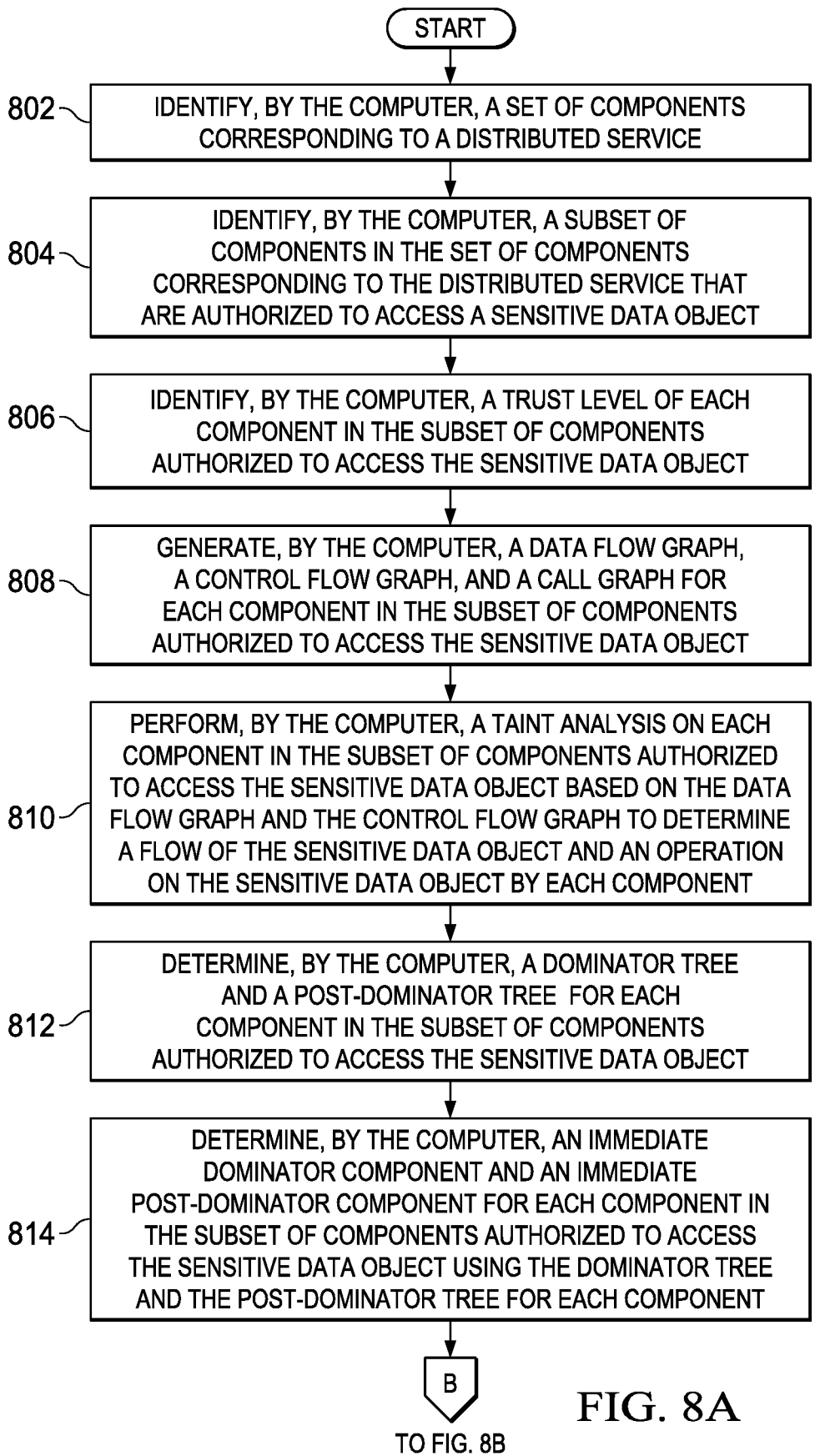
FIGS. 8A-8B are a flowchart illustrating a process for inserting audit log statements in accordance with an alternative illustrative embodiment.
Figure 8B:
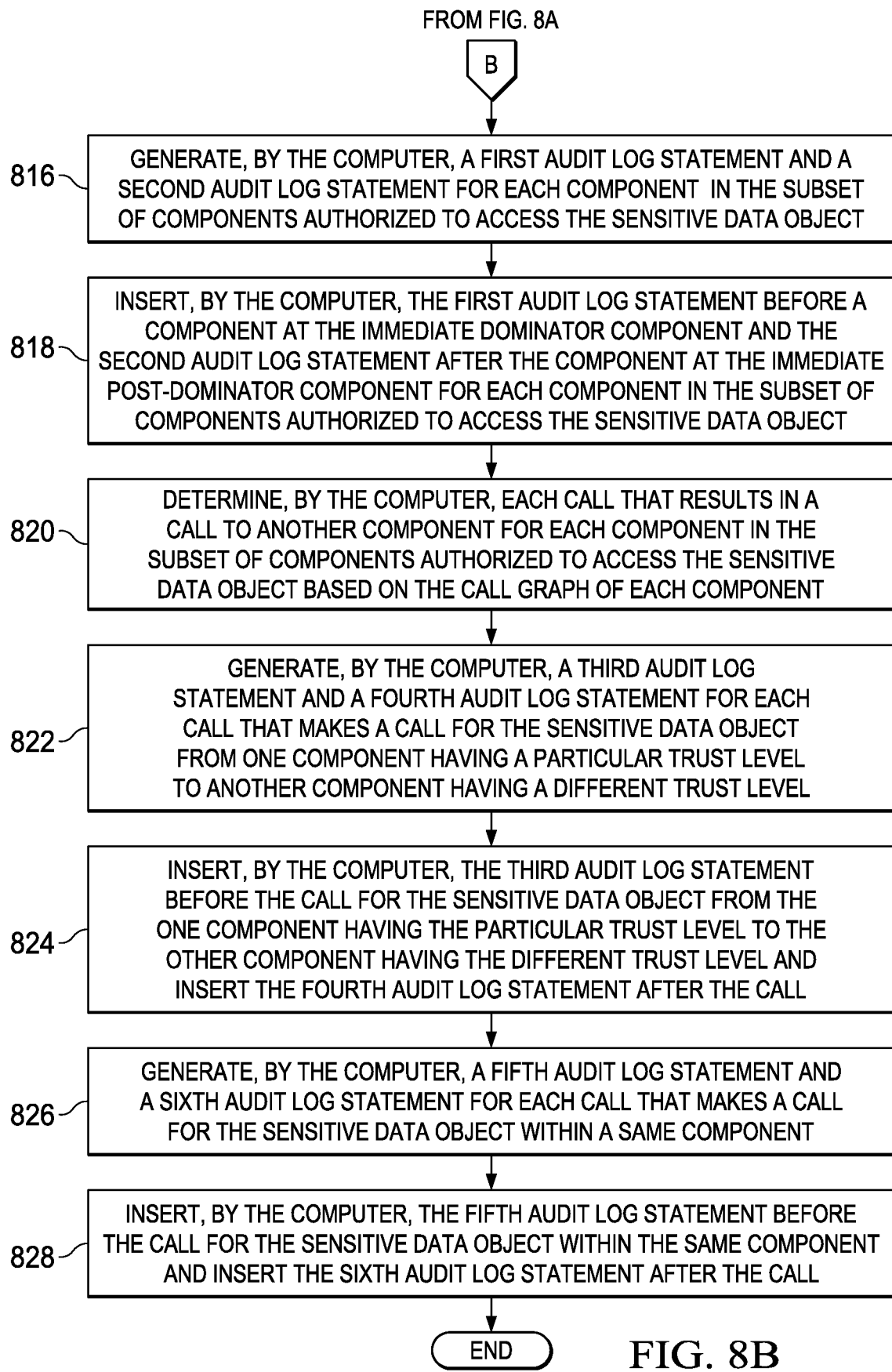

With reference now to FIGS. 8A-8B, a flowchart illustrating a process for inserting audit log statements is shown in accordance with an alternative illustrative embodiment. The process shown in FIGS. 8A-8B may be implemented in a computer, such as, for example, server 104 FIG. 1 and data processing system 200 in FIG. 2.

The process begins when the computer identifies a set of components corresponding to a distributed service (step 802). The computer also identifies a subset of components in the set of components corresponding to the distributed service that are authorized to access a sensitive data object (step 804). In addition, the computer identifies a trust level of each component in the subset of components authorized to access the sensitive data object (step 806).

Further, the computer generates a data flow graph, a control flow graph, and a call graph for each component in the subset of components authorized to access the sensitive data object (step 808). Afterward, the computer performs a taint analysis on each component in the subset of components authorized to access the sensitive data object based on the data flow graph and the control flow graph to determine a flow of the sensitive data object and an operation on the sensitive data object by each component (step 810). Furthermore, the computer determines a dominator tree and a post-dominator tree for each component in the subset of components authorized to access the sensitive data object (step 812). Moreover, the computer determines an immediate dominator component and an immediate post-dominator component for each component in the subset of components authorized to access the sensitive data object using the dominator tree and the post-dominator tree for each component (step 814).

Subsequently, the computer generates a first audit log statement and a second audit log statement for each component in the subset of components authorized to access the sensitive data object (step 816). The computer inserts the first audit log statement before a component at the immediate dominator component and the second audit log statement after the component at the immediate post-dominator component for each component in the subset of components authorized to access the sensitive data object (step 818).

The computer also determines each call that results in a call to another component for each component in the subset of components authorized to access the sensitive data object based on the call graph of each component (step 820). In addition, the computer generates a third audit log statement and a fourth audit log statement for each call that makes a call for the sensitive data object from one component having a particular trust level to another component having a different trust level (step 822). Further, the computer inserts the third audit log statement before the call for the sensitive data object from the one component having the particular trust level to the other component having the different trust level and inserts the fourth audit log statement after the call (step 824).

The computer also generates a fifth audit log statement and a sixth audit log statement for each call that makes a call for the sensitive data object within a same component (step 826). In addition, the computer inserts the fifth audit log statement before the call for the sensitive data object within the same component and inserts the sixth audit log statement after the call (step 828). Thereafter, the process terminates.

Figure 9:
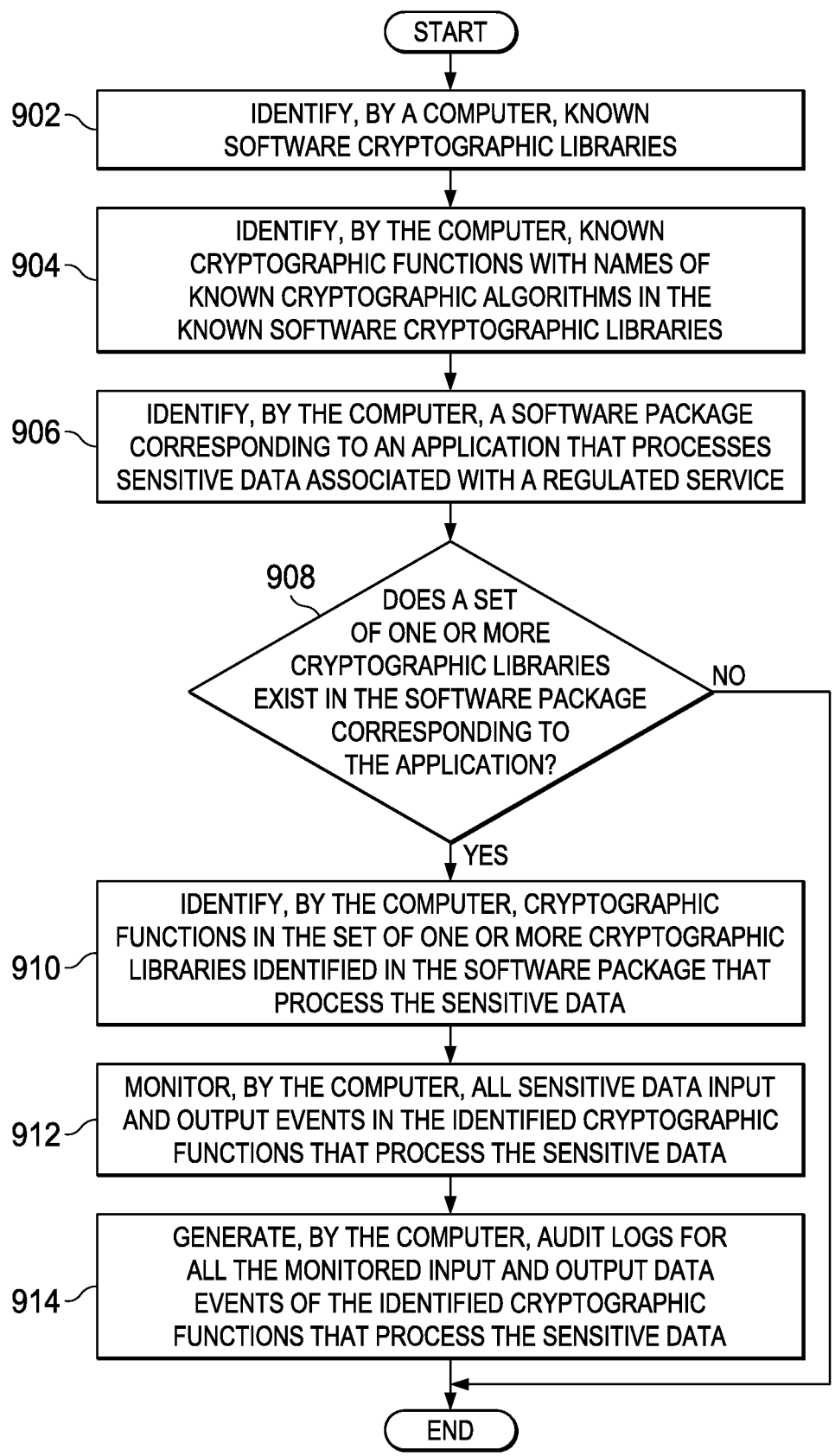
FIG. 9 is a flowchart illustrating a process for monitoring sensitive data input and output events in cryptographic functions in accordance with an alternative illustrative embodiment.

With reference now to FIG. 9, a flowchart illustrating a process for monitoring sensitive data input and output events in cryptographic functions is shown in accordance with an alternative illustrative embodiment. The process shown in FIG. 9 may be implemented in a computer, such as, for example, server 104 FIG. 1 and data processing system 200 in FIG. 2.

The process begins when the computer identifies known software cryptographic libraries (step 902). The computer also identifies known cryptographic functions with names of known cryptographic algorithms in the known software cryptographic libraries (step 904). In addition, the computer identifies a software package corresponding to an application that processes sensitive data associated with a regulated service (step 906). The application and software package may be, for example, application 220 and software components 236 in FIG. 2.

Afterward, the computer makes a determination as to whether a set of one or more cryptographic libraries exist in the software package corresponding to the application (step 908). If the computer determines that no cryptographic libraries exist in the software package corresponding to the application, no output of step 908, then the process terminates thereafter. If the computer determines that a set of one or more cryptographic libraries does exist in the software package corresponding to the application, yes output of step 908, then the computer identifies cryptographic functions in the set of one or more cryptographic libraries identified in the software package that process the sensitive data (step 910).

Further, the computer monitors all sensitive data input and output events in the identified cryptographic functions that process the sensitive data (step 912). Furthermore, the computer generates audit logs for all the monitored input and output data events of the identified cryptographic functions that process the sensitive data (step 914). Thereafter, the process terminates.

Thus, illustrative embodiments of the present invention provide a computer-implemented method, computer system, and computer program product for automatically generating audit logs of monitored sensitive data activity events in software applications that perform workloads corresponding to regulated services. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for automatically generating audit logs, the computer-implemented method comprising:
   identifying, by a computer, audit log statement insertion points in software components of an application based on a static code analysis identifying start and end operations on sensitive data in the software components of the application;
   instrumenting, by the computer, the application with audit log statements at the audit log statement insertion points in the software components of the application;
   generating, by the computer, audit logs of monitored sensitive data activity events in the application using the audit log statements at the audit log statement insertion points in the software components of the application;
   performing, by the computer, a dynamic code analysis on the application during execution of the application to prevent executing source code of the application from recording in the audit logs the sensitive data processed by the application;
   identifying, by the computer, a software package corresponding to the application;
   scanning, by the computer, code of the software package corresponding to the application to identify linked software packages and libraries to the application;
   identifying, by the computer, sensitive data input and output operations in the code of the software package and linked software packages and libraries that process the sensitive data; and
   generating, by the computer, a graph linking the code of the software package and linked software packages and libraries with the input and output operations processing the sensitive data.

2. The computer-implemented method of claim 1 further comprising:
   analyzing, by the computer, the audit logs for compliance with audit requirements.

3. The computer-implemented method of claim 2 further comprising:
   performing, by the computer, an action step regarding non-compliance of the audit logs with the audit requirements.

4. The computer-implemented method of claim 1 further comprising:
   receiving, by the computer, the application with labeled sensitive data and ingestion points within the application.

5. The computer-implemented method of claim 4 further comprising:
   identifying, by the computer, hardware components of a system hosting a regulated service authorized to access the sensitive data and the software components of the application that are authorized to access the sensitive data located at the labeled sensitive data and ingestion points within the application.

6. The computer-implemented method of claim 5 further comprising:
   performing, by the computer, a taint analysis on workflows tracking the sensitive data through the hardware components and the software components authorized to access the sensitive data.

7. The computer-implemented method of claim 6 further comprising:
   determining, by the computer, input and output sensitive data flow points for the software components of the application based on the taint analysis on the workflows tracking the sensitive data.

8. The computer-implemented method of claim 7 further comprising:
   generating, by the computer, a data flow graph and a control flow graph for the application based on the input and output sensitive data flow points for the software components of the application.

9. The computer-implemented method of claim 8 further comprising:
   performing, by the computer, the static code analysis on the application to generate use-definition chains identifying start and end operations on the sensitive data in the software components of the application using the data flow graph and the control flow graph of the application.

10. The computer-implemented method of claim 1 further comprising:
    identifying, by the computer, a trust level of each component authorized to access the sensitive data.

11. The computer-implemented method of claim 1 further comprising:
    determining, by the computer, a dominator tree and a post-dominator tree for each component authorized to access the sensitive data;
    determining, by the computer, an immediate dominator component and an immediate post-dominator component for each component authorized to access the sensitive data using the dominator tree and the post-dominator tree for each component;
    generating, by the computer, a first audit log statement and a second audit log statement for each component authorized to access the sensitive data; and
    inserting, by the computer, the first audit log statement before a component at the immediate dominator component and the second audit log statement after the component at the immediate post-dominator component for each component authorized to access the sensitive data.

12. The computer-implemented method of claim 1 further comprising:
    determining, by the computer, each call that results in a call to another component for each component authorized to access the sensitive data based on a call graph of each component;
    generating, by the computer, a third audit log statement and a fourth audit log statement for each call that makes a call for the sensitive data from one component having a particular trust level to another component having a different trust level; and
    inserting, by the computer, the third audit log statement before the call for the sensitive data from the one component having the particular trust level to the other component having the different trust level and inserting the fourth audit log statement after the call.

13. The computer-implemented method of claim 1 further comprising:

generating, by the computer, a fifth audit log statement and a sixth audit log statement for each call that makes a call for the sensitive data within a same component; and inserting, by the computer, the fifth audit log statement before the call for the sensitive data within the same component and inserting the sixth audit log statement after the call.

14. The computer-implemented method of claim 1 further comprising:

identifying, by the computer, a software package corresponding to the application;

responsive to the computer determining that a set of one or more cryptographic libraries exist in the software package corresponding to the application, identifying, by the computer, cryptographic functions in the set of one or more cryptographic libraries identified in the software package that process the sensitive data;

monitoring, by the computer, sensitive data input and output events in the cryptographic functions that process the sensitive data; and generating, by the computer, audit logs for the input and output data events of the cryptographic functions that process the sensitive data.

15. A computer system for automatically generating audit logs, the computer system comprising:

a bus system;

a storage device connected to the bus system, wherein the storage device stores program instructions; and a processor connected to the bus system, wherein the processor executes the program instructions to:

identify audit log statement insertion points in software components of an application based on a static code analysis identifying start and end operations on sensitive data in the software components of the application;

instrument the application with audit log statements at the audit log statement insertion points in the software components of the application;

generate audit logs of monitored sensitive data activity events in the application using the audit log statements at the audit log statement insertion points in the software components of the application;

perform a dynamic code analysis on the application during execution of the application to prevent executing source code of the application from recording in the audit logs the sensitive data processed by the application;

identify a software package corresponding to the application; scanning, by the computer, code of the software package corresponding to the application to identify linked software packages and libraries to the application;

identify sensitive data input and output operations in the code of the software package and linked software packages and libraries that process the sensitive data; and generate a graph linking the code of the software package and linked software packages and libraries with the input and output operations processing the sensitive data.

16. The computer system of claim 15, wherein the processor further executes the program instructions to:

analyze the audit logs for compliance with audit requirements.

17. The computer system of claim 16, wherein the processor further executes the program instructions to:

perform an action step regarding non-compliance of the audit logs with the audit requirements.

18. A computer program product for automatically generating audit logs, the computer program product comprising a computer readable storage medium having program instructions embodied therewith, the program instructions executable by a computer to cause the computer to perform a method comprising:

identifying, by the computer, audit log statement insertion points in software components of an application based on a static code analysis identifying start and end operations on sensitive data in the software components of the application;

instrumenting, by the computer, the application with audit log statements at the audit log statement insertion points in the software components of the application;

generating, by the computer, audit logs of monitored sensitive data activity events in the application using the audit log statements at the audit log statement insertion points in the software components of the application;

performing, by the computer, a dynamic code analysis on the application during execution of the application to prevent executing source code of the application from recording in the audit logs the sensitive data processed by the application;

identifying, by the computer, a software package corresponding to the application;

scanning, by the computer, code of the software package corresponding to the application to identify linked software packages and libraries to the application;

identifying, by the computer, sensitive data input and output operations in the code of the software package and linked software packages and libraries that process the sensitive data; and generating, by the computer, a graph linking the code of the software package and linked software packages and libraries with the input and output operations processing the sensitive data.

19. The computer program product of claim 18 further comprising:

receiving, by the computer, the application with labeled sensitive data and ingestion points within the application.

20. The computer program product of claim 19 further comprising:

identifying, by the computer, hardware components of a system hosting a regulated service authorized to access the sensitive data and the software components of the application that are authorized to access the sensitive data located at the labeled sensitive data and ingestion points within the application.

21. The computer program product of claim 20 further comprising:

performing, by the computer, a taint analysis on workflows tracking the sensitive data through the hardware components and the software components authorized to access the sensitive data.

22. The computer program product of claim 21 further comprising:

determining, by the computer, input and output sensitive data flow points for the software components of the application based on the taint analysis on the workflows tracking the sensitive data.

23. The computer program product of claim 22 further comprising:

generating, by the computer, a data flow graph and a control flow graph for the application based on the input and output sensitive data flow points for the software components of the application.

24. The computer program product of claim 23 further comprising:

performing, by the computer, a static code analysis on the application to generate use-definition chains identifying start and end operations on the sensitive data in the software components of the application using the data flow graph and the control flow graph of the application.

* * * * *